(12) United States Patent
Oakes

(10) Patent No.: US 9,462,753 B2
(45) Date of Patent: *Oct. 11, 2016

(54) CONTINUOUS BALER WITH SURGE BIN

(71) Applicant: Scott D. Oakes, Waukee, IA (US)

(72) Inventor: Scott D. Oakes, Waukee, IA (US)

(*) Notice: Subject to any disclaimer, the term of this patent is extended or adjusted under 35 U.S.C. 154(b) by 210 days.

This patent is subject to a terminal disclaimer.

(21) Appl. No.: 14/162,434

(22) Filed: Jan. 23, 2014

(65) Prior Publication Data

US 2015/0201561 A1   Jul. 23, 2015

Related U.S. Application Data

(63) Continuation of application No. 13/114,857, filed on May 24, 2011, now Pat. No. 8,707,865.

(51) Int. Cl.
*A01F 15/10*   (2006.01)
*A01F 15/07*   (2006.01)

(52) U.S. Cl.
CPC ......... *A01F 15/0705* (2013.01); *A01F 15/106* (2013.01)

(58) Field of Classification Search
CPC .. A01F 15/0705; A01F 15/106; A01F 15/08; A01D 89/00; A01D 89/001; A01D 89/002; A01D 82/00
USPC ......... 100/2, 3, 7, 35, 76, 87, 88, 89, 188 R; 56/131, 341
See application file for complete search history.

(56) References Cited

U.S. PATENT DOCUMENTS

| | | | | |
|---|---|---|---|---|
| 3,834,141 | A * | 9/1974 | Bracht | A01F 15/0816 100/73 |
| 4,604,857 | A * | 8/1986 | Maher | A01D 82/00 100/74 |
| 6,000,206 | A * | 12/1999 | Case | A01F 15/08 100/88 |
| 7,003,933 | B2 * | 2/2006 | Fukumori | A01F 15/106 100/4 |
| 8,707,865 | B2 * | 4/2014 | Oakes | A01F 15/106 100/35 |
| 2005/0051040 | A1 * | 3/2005 | Wingert | A01F 25/183 100/88 |
| 2008/0271428 | A1 * | 11/2008 | Rempe | A01D 89/003 56/341 |

* cited by examiner

*Primary Examiner* — Jimmy T Nguyen
(74) *Attorney, Agent, or Firm* — Camille L. Urban; David M. Breiner; G. Brian Pingel

(57) ABSTRACT

A continuous-operation baler assembly is provided which includes a separate and leading surge bin followed by a baler. The surge bin and baler each comprise a separate pick up mechanism for collecting agricultural material. When the baler has collected material and is ready to finish a bale the surge bin receives a signal and begins collecting agricultural material. Once the bale nears finish, the material collected by the surge bin is metered out into the path of or otherwise transferred to the baler during the next bale formation cycle, where it is picked up and formed into a bale.

22 Claims, 15 Drawing Sheets

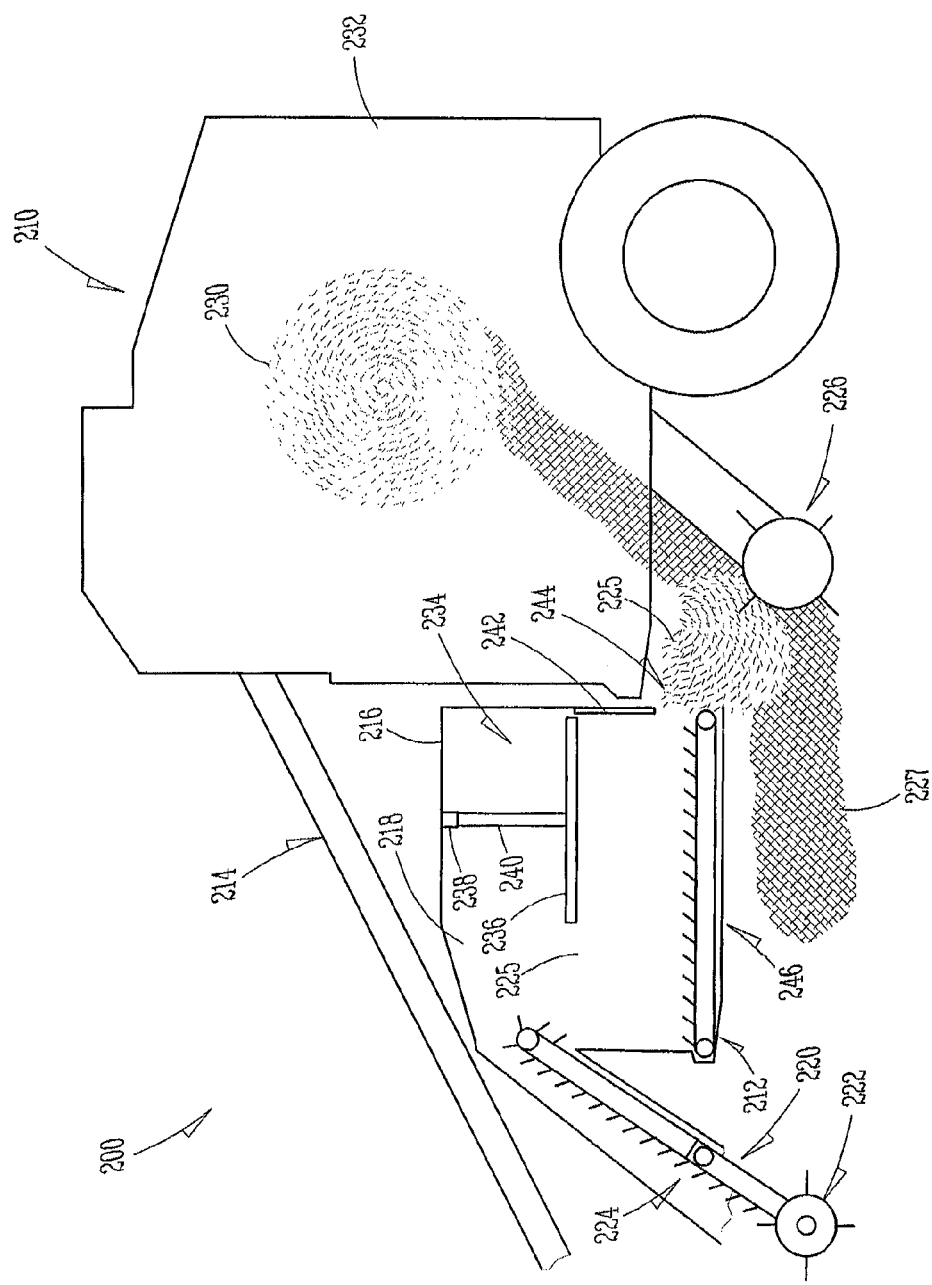

CONTINUOUS BALER WITH SURGE BIN

CROSS-REFERENCE TO RELATED APPLICATIONS

This application is a continuation of U.S. patent application Ser. No. 13/114,857 filed on May 24, 2011 with the United States Patent and Trademark Office, now U.S. Pat. No. 8,707,865, the entire contents of which is herein incorporated by reference.

BACKGROUND

1. Field of Invention

The present invention relates generally to the harvest of agricultural materials such as alfalfa and, specifically, to an assembly for continuously forming bales of the agricultural material without a need to stop while a bale is being finished before beginning a new bale.

2. Description of Other Art

Farm operators have long used various machines and processes to gather agricultural materials. Where the materials include plant materials such as leaves and stems, the general process includes cutting the plants and, usually, raking them into windrows where they are left to dry for a period of time. The operator may then go through the field with a rake to turn the windrow and expose more material drying.

Once adequately dried, the operator employs a machine that comprises a pick up mechanism (and perhaps a windrower elevator) to gather the dried material into a baler. There are many different balers; come create small rectangular bales easily hefted by a person, some produce larger rectangular bales more likely to be moved by machines, some produce large round bales that may only be moved with adequate power machinery. Each of these balers further includes a chamber into which the agricultural material is conveyed. In this chamber are means to shape and compress the material into the general bale shape and means to secure the baled materials together Securing the material may include tying cord, wire or twine, or wrapping a mesh-like wrap over it, or some combination thereof.

In order for the baler to tie or wrap the bale it must stop to allow time for that operation and avoid gathering more materials. If it did not stop gathering material, that material would be problematic for the tying operation. To avoid the negative impact of stopping for the formation of every bale a number of new apparatuses have been developed. Some employ a mechanism to move the formed bale into a different part of the chamber for tying. (see, e.g., U.S. Pat. Nos. 6,729,118; 5,136,831; 4,667,592; 4,656,812; 4,534,285; 4,510,861). In many cases this is accomplished via tension-loaded belts and rollers wherein the position of the rollers move in order to transition the forming bale from an early stage compartment near the leading edge of the baler (near the windrow pickup) to a later stage compartment near the trailing edge of the baler. The compartments are, at least in part, formed by the positions of the tensioned belts. Essentially, the baling unit is divided into the two chambers and these change in size via movement of the belts and rollers through the bale forming process. The first area expands with the growing bale until it reaches a certain size (and certain level of tension on the belts). Then, through movement of the rollers and the associated belts, the trailing edge of the early stage compartment is opened and the forming bale is moved toward the back of the round baler into what becomes the later stage compartment where the bale is wrapped and/or tied. While it is being wrapped and/or tied, the early stage chamber is still receiving forage and beginning to form the core of the next bale.

Some balers in this general format have the bale completely formed in the first chamber, and merely wrap/tie in the latter. Others form the core in one chamber, and then finish the bale in the second chamber where it is also wrapped and tied. The chambers can be arranged laterally as described herein, or vertically. Sometimes the transition from one chamber to the other is assisted by a mechanical arm (U.S. Pat. No. 4,625,502). Still another invention employs a conveyor from the windrow pick up and a moveable physical obstruction between the first and second chambers to effect means to continuously bale. (U.S. Pat. Nos. 4,057,954; 4,514,969).

Most of the aforementioned attempts to remove the need to stop during bale formation are complex machines with multiple moving parts and are fairly expensive. Further, they are usually replacements for the balers already owned by operators rather than providing a solution to be employed with the original balers in which the farm operators have invested.

What was needed was a resolution to the problem of time loss and wear on equipment caused by regularly stopping forward movement across the field, without the prohibitive cost of a dual baler system.

SUMMARY

This summary is provided to introduce a selection of concepts in a simplified form that are further described below in the Detailed Description. This summary is not intended to identify key features or essential features of the claimed subject matter, nor is it intended to be used, in isolation, as an aid in determining the scope of the claimed subject matter. At a high level, embodiments of the invention relate to a continuous baling system having a surge bin disposed in front of a baling assembly.

A first illustrative embodiment of the present invention relates to a baling system for creating bales of agricultural material. In embodiments, the system includes a baling assembly having a baling chamber. The baling assembly includes a first pickup that picks up agricultural material up from the ground and transfers the material to the baling chamber, where the material is formed into a bale. In various embodiments, the baling system further includes a surge bin disposed in front of the baling assembly. The surge bin includes a second pickup that picks up agricultural material from the ground and provides the material to a chamber disposed within the surge bin. The surge bin contents can be transferred back to the primary windrow pickup assembly for incorporation into the next bale upon or near in time to the ejection of a completed bale. The speed of the transfer can be adjusted to satisfy operator preferences. In embodiments, the surge bin includes a translation means for translating the bin contents within the bin and, in embodiments, the surge bin includes an optional compression means for compressing the bin contents if more capacity is required.

A second illustrative embodiment of the present invention relates to a method for baling agricultural material using a baling system having a surge bin that is disposed in front of a baling assembly. In embodiments, the baling assembly includes a first pickup and the surge bin includes a second pickup. Embodiments of the illustrative method include receiving agricultural material into the baling assembly via the first pickup and forming the agricultural material into a first bale. The illustrative method also includes receiving additional agricultural material into the surge bin via the second pickup, so that forward progress can be maintained while the completed bale is tied. In embodiments, the method includes preparing the bale for ejection by the baling assembly at about the same time as transferring the additional agricultural material from the surge bin to the baling assembly.

These and other aspects of the invention will become apparent to one of ordinary skill in the art upon a reading of the following description, drawings, and the claims.

BRIEF DESCRIPTION OF THE DRAWINGS

The present invention is described in detail below with reference to the attached drawing figures, wherein:

FIG. 12 is a cross-sectional side view of an illustrative baling system showing a surge bin unloading process, in accordance with embodiments of the invention;

DETAILED DESCRIPTION

The subject matter of embodiments of the invention disclosed herein is described with specificity to meet statutory requirements. However, the description itself is not intended to limit the scope of this patent. Rather, the inventors have contemplated that the claimed subject matter might also be embodied in other ways, to include different features or combinations of features similar to the ones described in this document, in conjunction with other technologies. Generally, embodiments of the invention relate to a continuous round baler having an automatically-controlled surge bin. By implementing embodiments of the invention, the operator can continue pulling the baler over the agricultural material to be baled, even during a bale-tying and dropping sequence.

Figure 1:
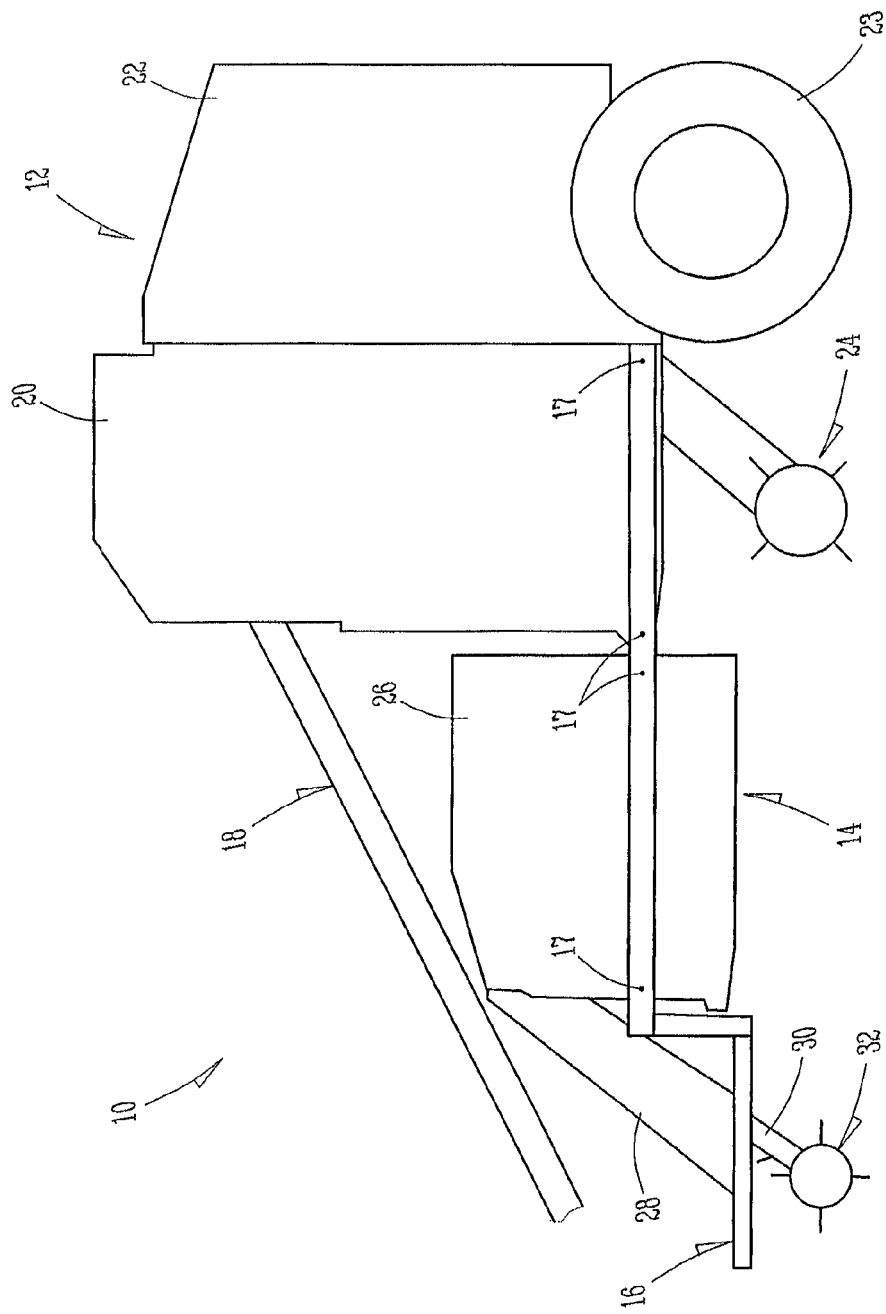
FIG. 1 depicts a side view of an illustrative baling system, in accordance with embodiments of the invention.

Referring to the drawings, and particularly to FIG. 1, there is depicted an illustrative baling system 10. As shown in FIG. 1, the illustrative baling system 10 includes a baler apparatus 12 and a surge bin 14 that can be coupled to a tow vehicle (not illustrated for the purposes of clarity and brevity) and pulled over pre-cut agricultural material such as, for example, forage material, silage material, hay, and the like, to create bales of the agricultural material. According to embodiments of the invention, the illustrative baling system 10 can include any number of other features not illustrated or described herein. Furthermore, in some embodiments, the system 10 might be self-propelled (e.g., include its own engine) such that an operator can drive the baling system 10 directly, without needing to pull the system 10 with a tow vehicle.

It should be understood that the illustrative baling system 10 is merely one example of a suitable baling system and is not intended to express or suggest any particular limitations regarding implementations of aspects of embodiments of the invention. For example, in some embodiments, the baling apparatus 12 and/or the surge bin 14 can include any number of additional components. In some embodiments, one or more of the components described herein can be integrated with one another and in other embodiments, one or more of the components described herein can be separated into any number of desired functions and the like. All of these various embodiments and implementation are considered to be within the ambit of the invention.

In embodiments, the baling apparatus 12 (which may be referred to herein, interchangeably, as a "baler") can include any type of baler such as, for example, a small round baler, a large round baler, a small square baler, a large square baler, and the like. Although the baler 12 (and other illustrative balers illustrated and described herein) is generally depicted as a small round baler, this is only one example of a suitable baler configuration and is not intended to express or suggest any limitation on the configuration of balers used in various implementations of embodiments of the invention. In some embodiments, the baling apparatus 12 can be an apparatus that is designed for use in a baling system 10 such as an embodiment of the system 10 described herein. According to embodiments of the invention, the surge bin 14 can be an independent unit that can be retrofitted onto existing balers 12. In other embodiments, the baler 12 and the surge bin 14 can be integrated into a single unit, which may be towable, self-propelled, or both.

In the illustrated embodiment of FIG. 1, the surge bin 14 is an independent unit and is retrofitted to a standard round baler. As shown, the surge bin 14 is coupled to the baler 12 using a modified hitch 16, which is fixed, at various points, to the baler 12 and surge bin 14 using fasteners 17. The modified hitch 16 can be any type of hitch apparatus and can, in some cases, include an extension or other modification to allow the hitch 16 to be used to couple the surge bin 14 to the baler 12 and the towing system 10 to a tow vehicle. In some embodiments, the surge bin 14 and baler 12 can be coupled to one another such as, for example, by employing an extender, welding, bolting, or the like. In other embodiments, the baler 12 and surge bin 14 are separate components of a single apparatus with, in some instances, may include a common frame, chassis, or the like. In other embodiments, the baler 12 and the surge bin 14 can be pulled in series, but without necessarily connecting the two components 12 and 14 together.

With continued reference to FIG. 1, the baling system 10 also includes a power take-off (PTO) assembly 18 that is used to provide mechanical power to one or more components of the baling system 10. In embodiments, the PTO assembly 18 is connected to a PTO connection (not illustrated herein for the purposes of clarity and brevity) on the tow vehicle. The PTO connection on the tow vehicle includes a means of applying rotational energy to the PTO assembly 18. The rotational energy is transferred into mechanical energy for driving the various parts of one or more components of the baling system 10. In some embodiments, the PTO assembly 18 can also be used to provide electrical power and/or hydraulic power to the baling system 10.

Figure 8:
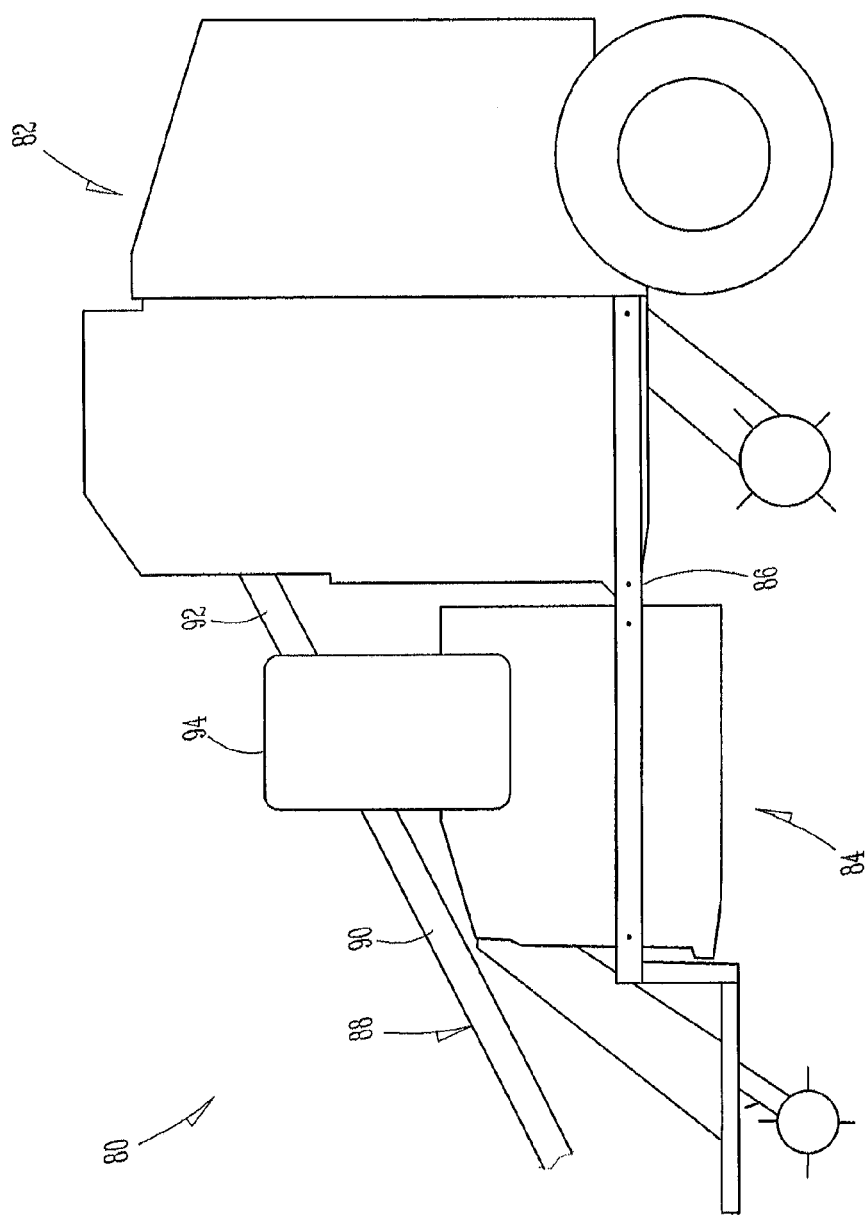
FIG. 8 is a side view of an illustrative baling system showing an illustrative PTO extension apparatus, in accordance with embodiments of the invention.
Figure 9:
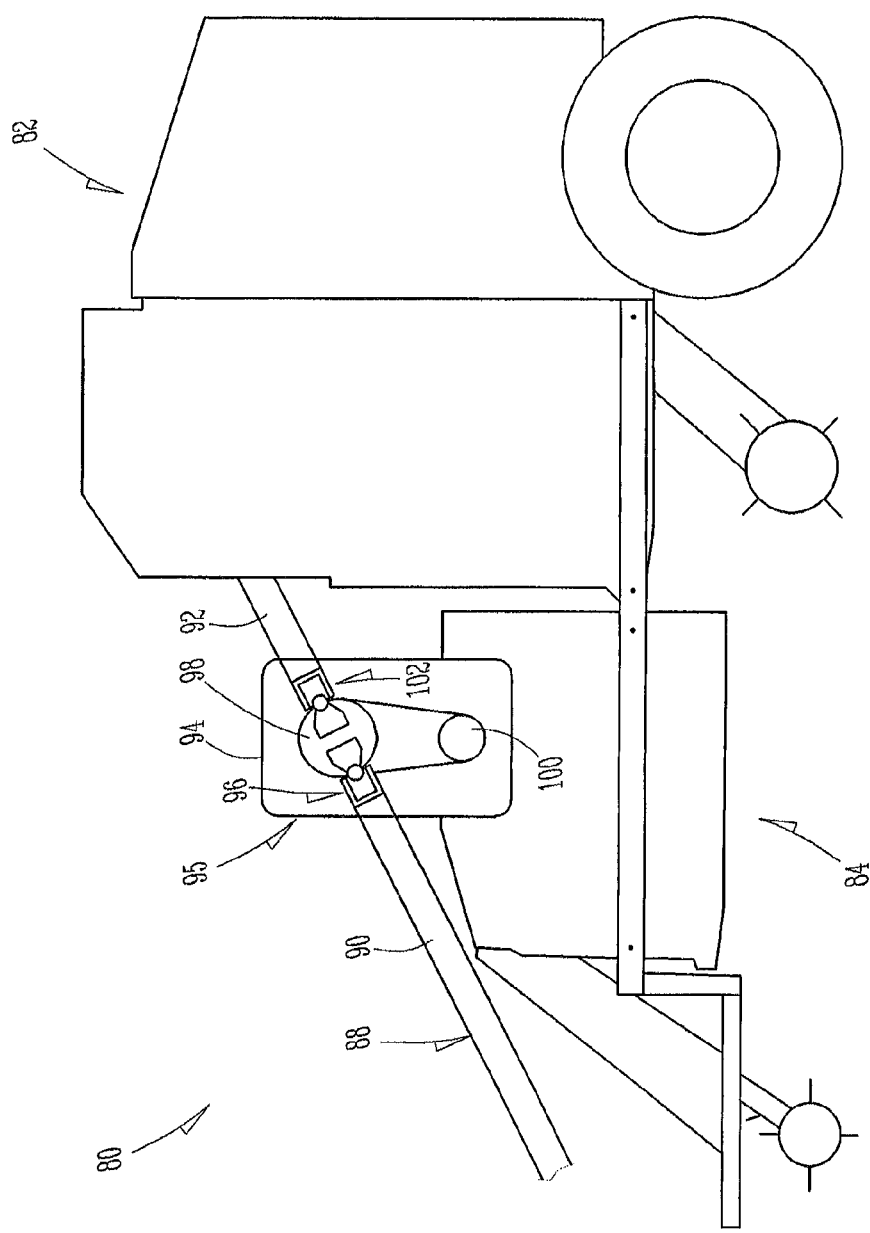
FIG. 9 is a cross-sectional side view of an illustrative baling system showing features of an illustrative PTO extension apparatus, in accordance with embodiments of the invention.
Figure 10:
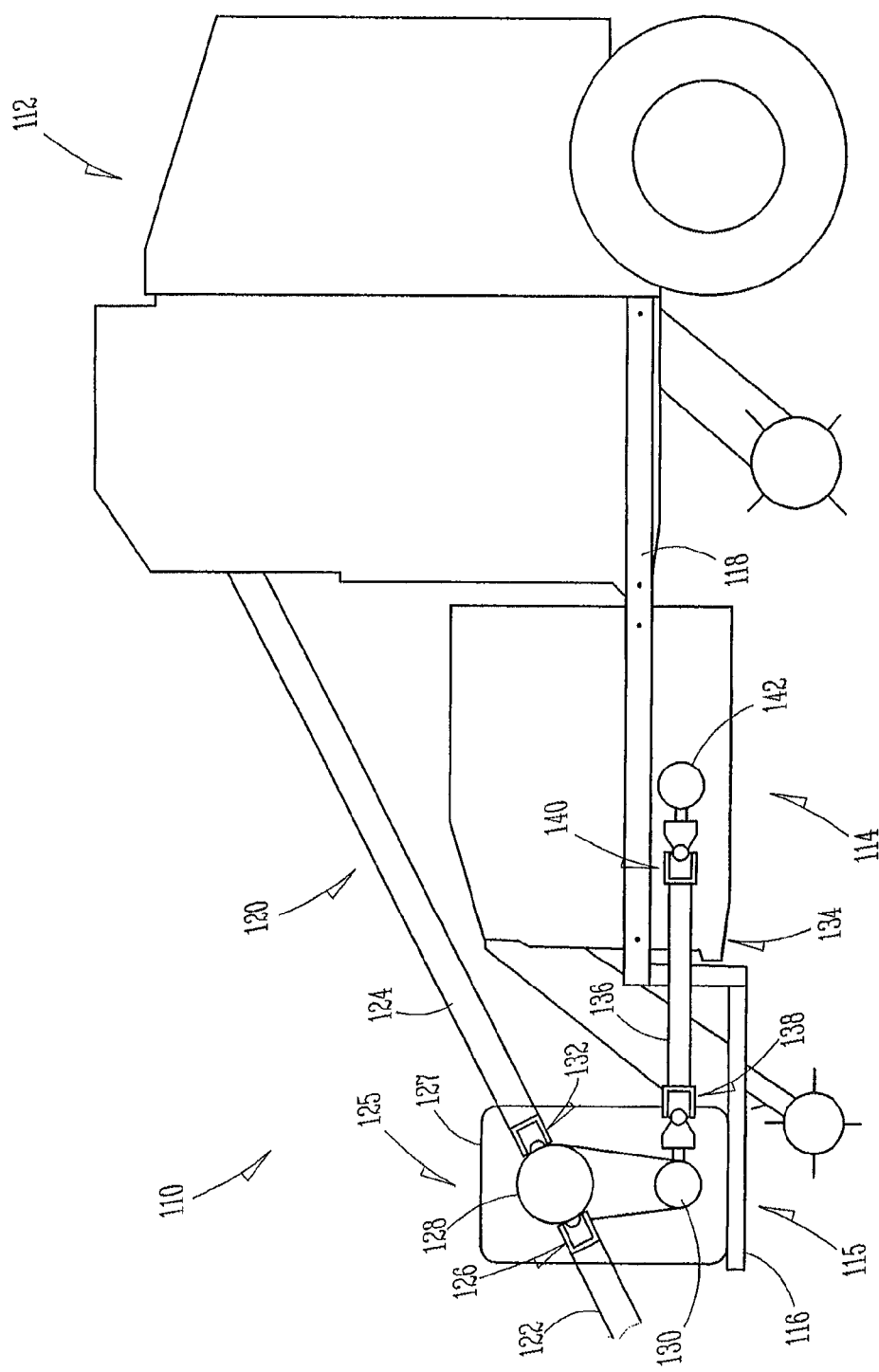
FIG. 10 is another cross-sectional side view of an illustrative baling system showing features of an illustrative PTO extension apparatus and PTO assembly, in accordance with embodiments of the invention.

For example, in an embodiment, the PTO assembly 18 can be used to provide mechanical power to the baler 12. In other embodiments, the PTO assembly 18 can be used to provide mechanical power to the surge bin 14. In further embodiments, as illustrated in FIGS. 8-10, the PTO assembly 18 can be used to provide mechanical power to both the baler 12 and the surge bin 14. In still further embodiments, the baling system 10 can be self-propelled, in which case, there may be no need for a PTO assembly 18.

As shown in FIG. 1, the baler 12 includes a front portion 20 and a rear portion 22. In embodiments, the rear portion 22 can be pivotably connected to the front portion 20 such that, for example, the rear portion 22 can be pivoted upwards to allow a formed bale to be ejected from the baler 12. In some embodiments, the front portion and the rear portion 22 are integrated into a single unit and, in some cases, a door (not illustrated) can be provided to allow ejection of a formed bale. The baler 12 also may include a drive system 23 (e.g., wheels, tracks, etc.) and a windrow pickup 24. The windrow pickup ("first pickup") 24 can, in some embodiments, be adjustable, independently controllable, and the like. In an embodiment, the pickup 24 can be selectively raised and lowered.

As is further illustrated in FIG. 1, the surge bin 14 includes a body 26, to which is connected an elevator guard 28 that houses a windrow elevator 30 disposed in front of (or, in some embodiments, below) the surge bin 14. The windrow elevator 30 terminates, at a lower end thereof, in a windrow pickup ("second pickup") 32. In embodiments, the second pickup 32 can be raised and lowered, selectively, adjusted, and the like. In embodiments, the elevator 30 can be adjusted, raised, lowered, pivoted, or the like.

In operation, as described below in more detail, agricultural material is fed into the baler 12 via the first pickup 24. While the material is being received by the baler 12, the baler 12 begins forming the material into a bale. When a bale is complete and ready, or nearly ready, to be wrapped, tied, and ejected, (or at any other time during the baling cycle), the second pickup 32 can be activated, drawing material into the surge bin 14 via the elevator 30. In some embodiments, for example, the second pickup 32 can be in a raised position until activated. When activated, the second pickup 32 is lowered to intercept the agricultural material. As the material is picked up by the second pickup, it is transferred into the surge bin on the elevator 30. The first pickup 24 can, in embodiments, remain active even though no agricultural material may be available to it. Alternatively, in other embodiments, the first pickup 24 can be raised or retracted or otherwise deactivated while the second pickup 32 is engaged. As shown in FIG. 1, the elevator 30 can be connected near an upper portion of the surge bin 14, so that the surge bin 14 is filled with material from the top.

Material can be transferred from the surge bin 14 to the baler 12 in any number of ways. In some embodiments, the material is ejected from the surge bin 14 (or, in some cases, material is metered out into the path of the first pickup during the next bale formation cycle 24. In some embodiments, a transfer conveyor (not illustrated) can move material from the surge bin 14 into the baler 12. In other embodiments, for example, the surge bin 14 can be interconnected with the baler 12 such that the material is mechanically pushed from one component to another.

Figure 2:
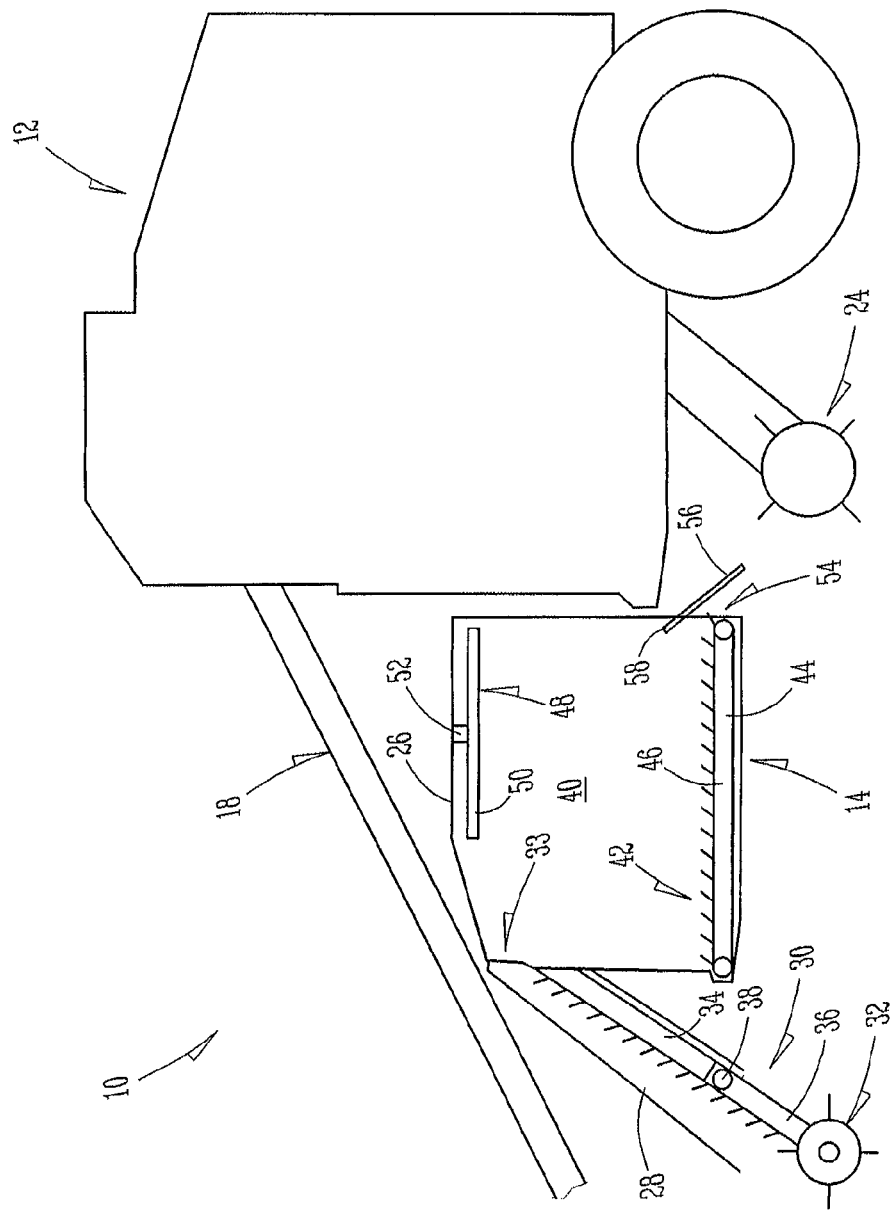
FIG. 2 is a cross-sectional side view of an illustrative baling system, in accordance with embodiments of the invention.

Turning to FIG. 2, a cross-sectional side-view of the illustrative baling system 10 is depicted, showing some internal features of the surge bin 14. As illustrated in FIG. 2, the surge bin 14 includes a body 26 that houses a chamber 40. Disposed on top of the body 26 is a motor 17 that can be used to facilitate any number of the various mechanical functions described herein. According to embodiments, the motor 17 can be any type of suitable motor such as, for example, an electric motor, a hydraulic motor, and the like. Additionally, according to various embodiments, the motor 17 can be disposed in any number of other positions including, for example, on the side of the surge bin 14, on the bottom of the surge bin 14, on the back of the surge bin 14, on the front of the surge bin 14, within the surge bin 14, and the like. In some embodiments, the surge bin 14 can include a number of different motors 17 for powering various assemblies in the surge bin 14.

As shown, the surge bin 14 includes a windrow elevator 30 extending from a pickup 32 to an opening 33 in the body 26. In operation, the pickup 32 picks up agricultural material, which is conveyed, by the elevator 30, through the opening 33 into the chamber 40, where the material can be stored for any desired amount of time. As illustrated, the elevator 30 is protected by an elevator guard 28. In some embodiments, the baling system 10 does not include an elevator guard 28.

According to various embodiments of the invention, the elevator 30 can include two or more portions 34 and 36. For instance, in embodiments, the elevator 30 includes an upper portion 34 that is configured to deliver agricultural material to the chamber 40 through the opening 33. A lower portion 36 of the elevator 30 is pivotably connected, at a pivot joint 38, to a lower end of the upper portion 34 of the elevator 30. According to various embodiments, the pivot joint 38 allows for the lower portion 36 of the elevator to be pivoted up and away from the ground. According to other embodiments, the lower portion 36 of the elevator 30 can be slideably coupled to the upper portion 34 of the elevator such that the lower portion 36 can slide upward away from the ground. In other embodiments, the elevator 30 can include two or more telescoping portions that allow for the pickup 32 disposed at the lower end of the elevator 30 to be pulled away from the ground. In still further embodiments, the elevator 30 can include any number of other pivot joints 38, portions 34 and 36, or the like. In still further embodiments, the elevator 30 can be pivotable near its upper end.

With continued reference to FIG. 2, the illustrative surge bin 14 further includes a means 42 for translating agricultural material within the chamber ("translation means"). In other embodiments, the surge bin 14 can be implemented without a translation means 42, and in further embodiments, the surge bin 14 can include more than one translation means 42. In embodiments, the translation means 42 can be used to prevent agricultural material from settling, getting matted down, or the like. According to various embodiments of the invention, the translation means 42 can include any number of different types of mechanisms suitable for agitating (e.g., by translating the material) the agricultural material in the chamber 40 of the surge bin 14. For example, in the illustrated embodiment of FIG. 2, the translation means 42 includes a conveyor 44 having a number of flights 46 coupled thereto. As the conveyor operates, the flights 46 are pulled in some direction, thereby catching pieces of material and moving the caught pieces. In other embodiments, the translation means 42 can include a screw conveyor, an auger, rotating tines, or any other mechanism suitable for translating the material in the chamber 40. In addition to agitation, the translation means 42 can be used to translate the material within the chamber 40.

As shown in FIG. 2, the surge bin 14 also includes an opening 54 through which agricultural material can be ejected from the chamber 40 of the surge bin 14. A door 56 can be used to cover the opening 54 but a door 56 is not critical for operation. In embodiments, the door 56 can be pivotably coupled, at a pivot point 58, to the body 26 of the surge bin 14 so that the door can pivot up (or down or to one side or the other) and away from the opening 54, thereby allowing agricultural material to be removed from the chamber 40 of the surge bin 14. In other embodiments, the door 56 can be slideably coupled to the body 26 so that the door 56 can slide out of the way of the opening 54. Any number of other mechanisms can be used to moveably attach the door 56 to the body 26 such that the opening 54 can be selectively covered and uncovered. In embodiments, the door 56 can be coupled to mechanisms that allow for automatic opening thereof or manual opening thereof.

As is further illustrated in FIG. 2, the surge bin 14 includes a means 48 for compressing ("compression means") the contents of the chamber 40 of the surge bin 48. In embodiments of the invention, the compression means 48 can be used to apply pressure to the top of a pile of agricultural material that has been deposited into the chamber 40 of the surge bin 14. Compressing the material can enable the chamber 40 to hold more material, can keep the material more densely packed, and the like.

As illustrated in FIG. 2, the compression means 48 includes at least one contact member 50 that can be formed from any suitable material and that is operated by a compression-means drive assembly 52. In embodiments, the at least one contact member 50 can include, for example, a flat sheet of material with an angled top to keep material from collecting above the compression piece, a bar, a mesh, or some combination of those, or the like. In some embodiments, the at least one contact member 50 is an underside of the top of the surge bin 48, where the top of the surge bin 14 can be lowered to compress the materials in the chamber 40 of the surge bin 14. With continued reference to FIG. 2, the compression-means drive assembly 52 can include any number of different types of mechanisms operable to cause at least one contact member 50 to apply pressure to agricultural material in the chamber 40 of the surge bin 14. In embodiments, for example, the compression-means drive assembly 52 can include a mechanical drive system, an inertial drive system, an electrical drive system, a magnetic drive system, a hydraulic drive system, or the like.

Figure 3:
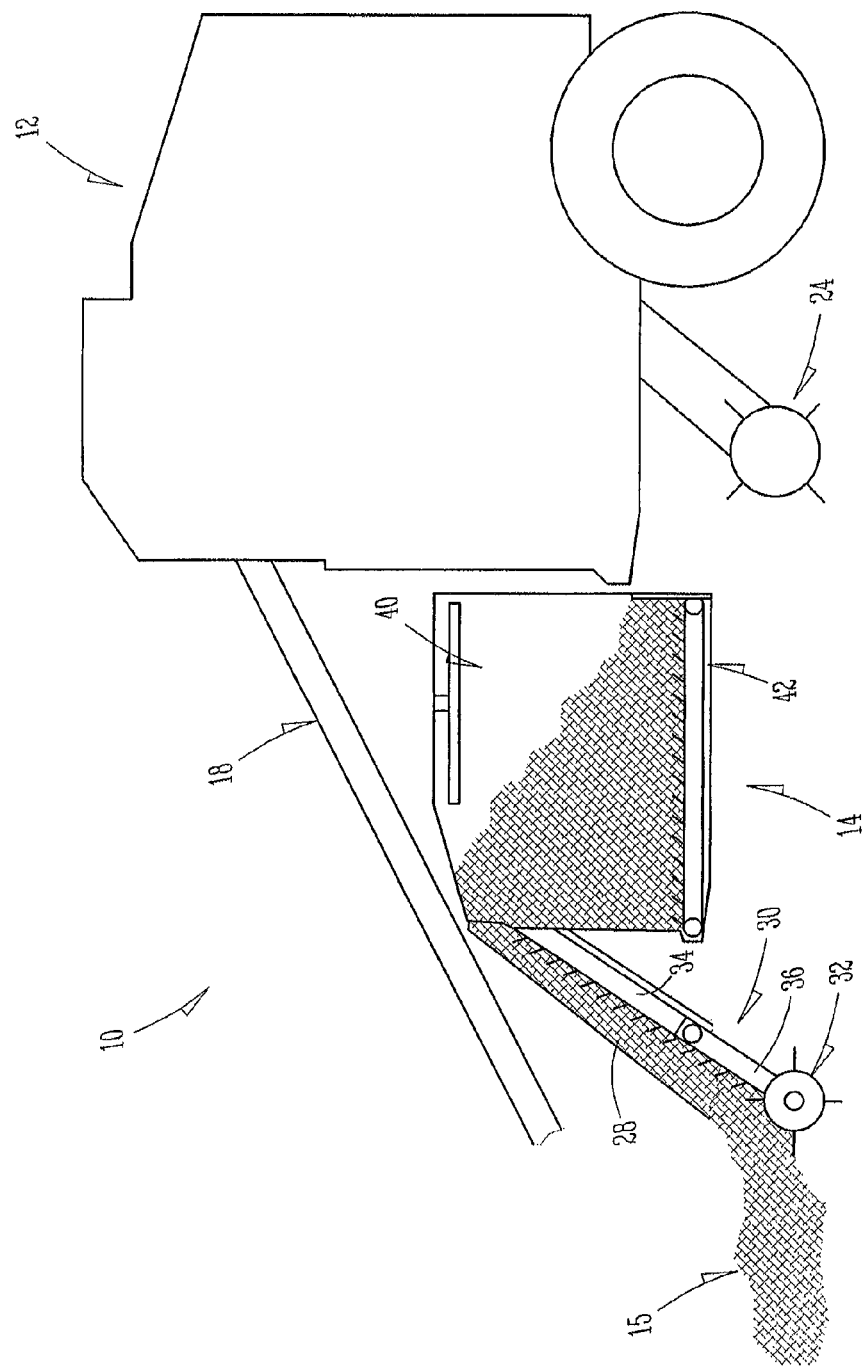
FIG. 3 is a cross-sectional side view of an illustrative baling system showing agricultural material being loaded into a surge bin, in accordance with embodiments of the invention.
Figure 4:
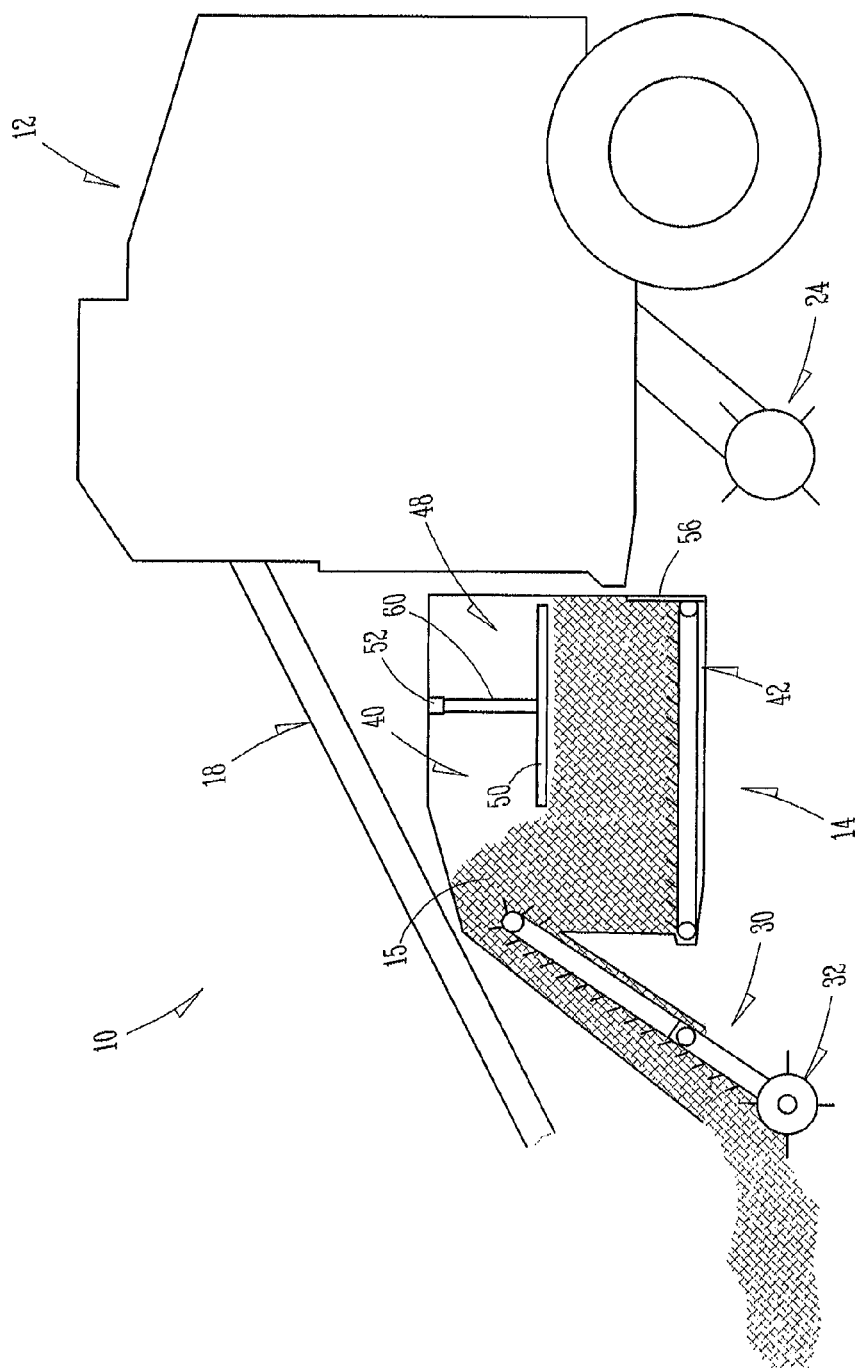
FIG. 4 is a cross-sectional side view of an illustrative baling system showing operation of an illustrative compression means in a surge bin, in accordance with embodiments of the invention.

Turning now to FIG. 3, the illustrative baling system 10 is depicted in a cross-sectional side-view and is shown during a loading sequence of the surge bin 14. As illustrated in FIG. 3, agricultural material 15 is picked up from the ground by the pickup 32. The material 15 is conveyed from the pickup 32 into the chamber 40 of the surge bin 14 using the windrow elevator 30. As the chamber 40 begins to fill with the material 15, it may be, in some cases, desireable to compress the material 15 that has been received by the chamber 40. Turning to FIG. 4, an exemplary compression operation is depicted in the context of a cross-sectional side-view of the illustrative baling system 10. As illustrated, the compression means 48 can be operated to compress the material 15 in the chamber 40 of the surge bin 14.

As shown in FIG. 4, the compression means 48 can include a compression-means drive assembly 52 that drives at least one piston 60. Each of said at least one contact member 50 is attached to the lower end of one of the at least one piston 60. For instance, the compression-means drive assembly 52 can cause hydraulic pressure to push one or more of said at least one piston 60 downward, thereby causing its associated contact member or members 50 to apply pressure to the top of the pile of material 15 in the chamber 40. In other embodiments, the piston 60 can be driven by electronic force, mechanical, force, magnetic force, or the like. In some embodiments, the compression-means drive assembly 50 does not drive a piston 60, but rather drives a chain, a set of gears, or the like. Any number of different mechanisms can be utilized to operate the compression means 48 and all of such mechanisms are considered to be within the ambit of the invention.

In various embodiments, the compression means 48 can be automatically initiated, manually initiated, or both. In some embodiments, the compression means 48 can apply constant pressure to the material 15, while, in other embodiments, the compression means 48 applies periodic pressure to the material 15. This application of pressure to the material 15 in the chamber 40 compresses the material 15, thereby creating more free space within the chamber to facilitate receiving additional material 15 into the chamber 40. As is further illustrated in FIG. 4, the surge bin 14 can include a bin-fill detector 61 that is configured to determine when the surge bin 14 has reached a desired, or maximum, capacity. In some embodiments, the bin-fill detector 61 can be a mechanical lever assembly, an electrical sensor, an optical sensor, or the like.

Figure 5:
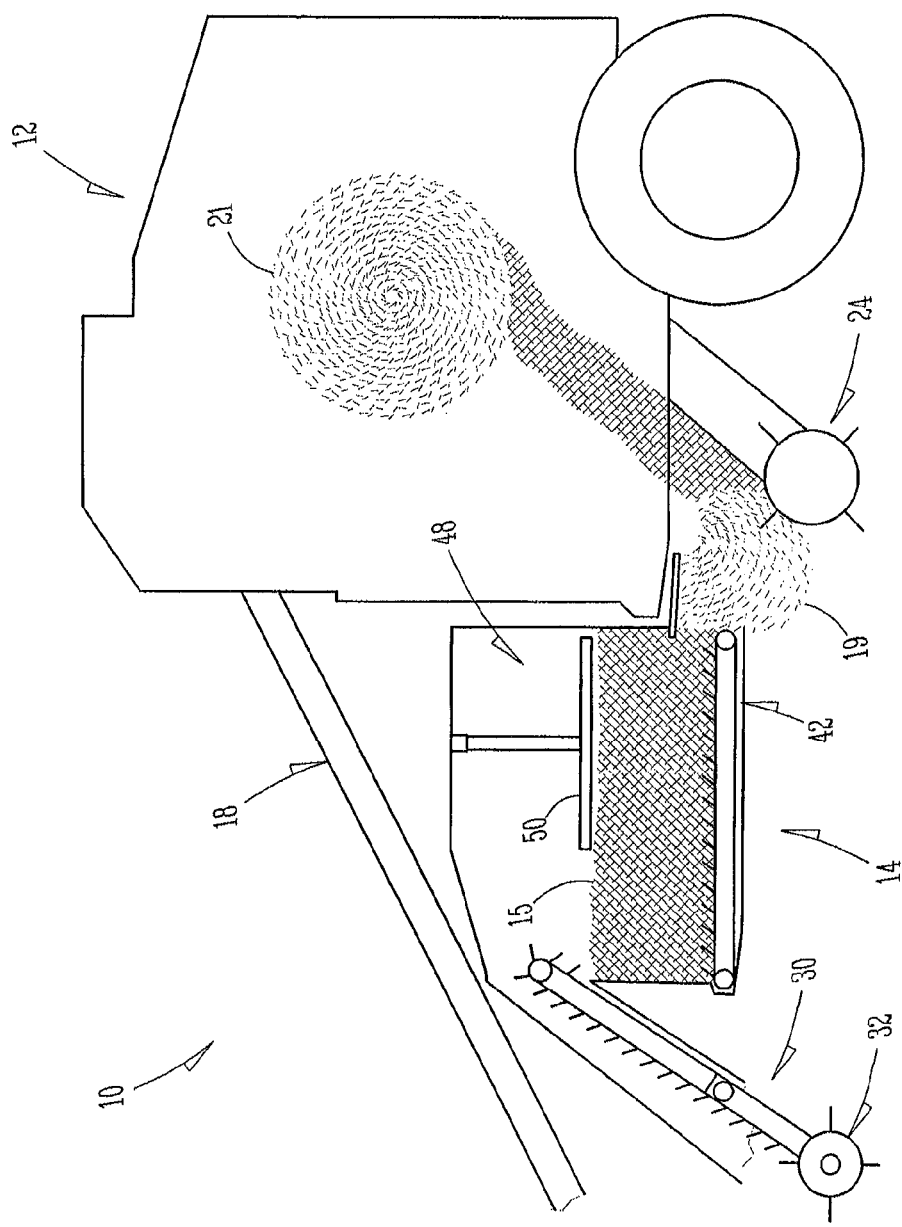
FIG. 5 is a cross-sectional side view of an illustrative baling system showing agricultural material being unloaded from a surge bin, in accordance with embodiments of the invention.

Turning now to FIG. 5, the illustrative baling system 10 is depicted, in a cross-sectional side-view, during a bin-unloading process. That is, material 15 is shown as being unloaded from the chamber 40 of the surge bin 14. As illustrated in FIG. 5, the door 56 can be moved to expose the opening 54 in the surge bin 14. In embodiments, the material 15 can then be allowed to fall from the chamber 40, can be pushed from the chamber 40, can be dumped from the chamber 40, or the like. For example, in an embodiment, the translation means 42 can be operated to help move material 15 toward the opening 54. That is, for instance, in the case in which the translation means 42 includes a conveyor or auger, the translation means 42 can be operated such that the direction of operation of the translation means 42 helps move material 15 toward the opening 54. Moreover, the door 56 can be hinged, slideable, and the like. In embodiments the door 56 is opened by some type of drive mechanism. In still further embodiments, the door 56 is pushed open by the material in the surge bin as it exits the surge bin 14.

Figure 6:
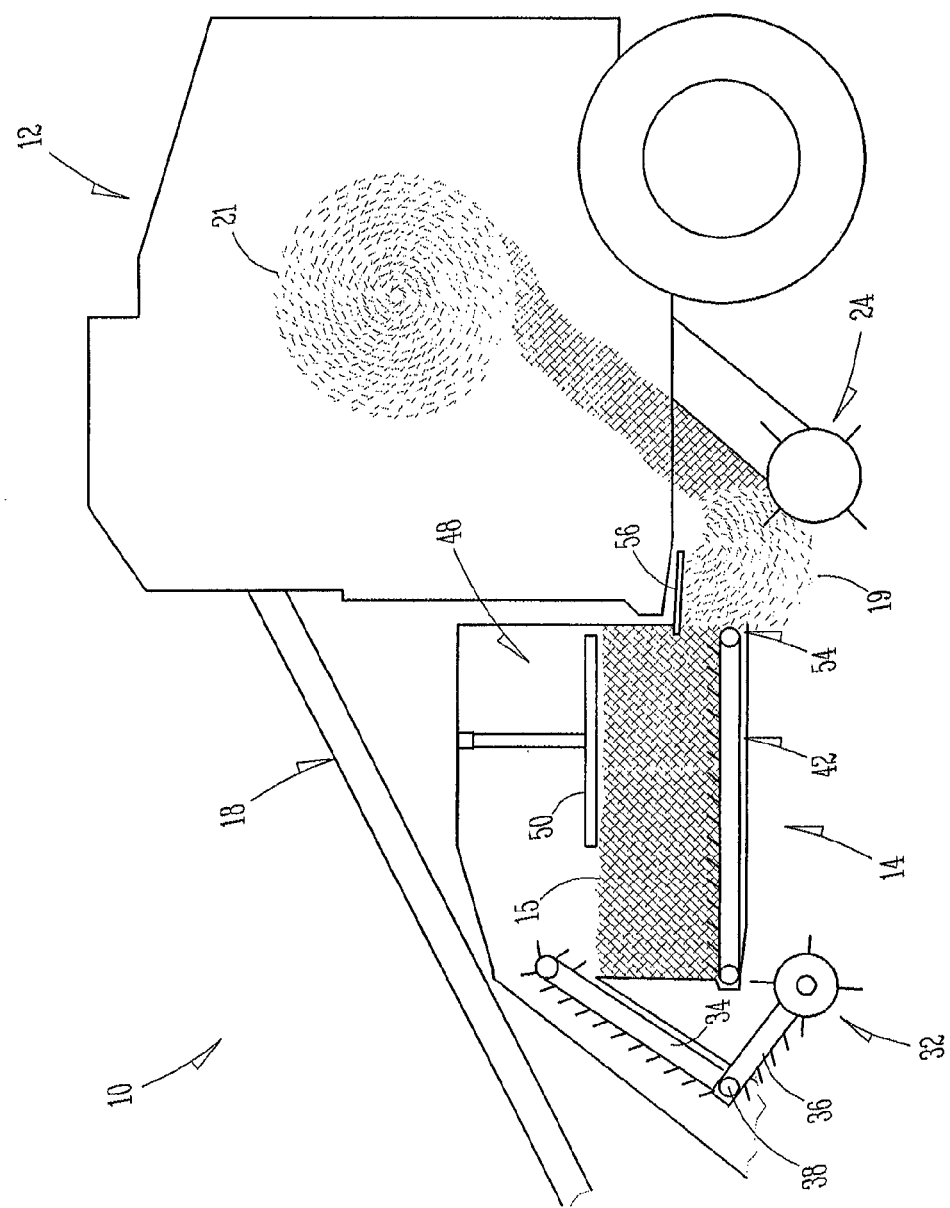
FIG. 6 is another cross-sectional side view of an illustrative baling system showing agricultural material being unloaded from a surge bin, in accordance with embodiments of the invention.

With continued reference to FIG. 5, the unloaded material 19 is deposited in the path of the first pickup 24, which picks up the unloaded material 19 and transfers it into the baler 12, which adds the unloaded material 19 (and any other material that the pickup 24 may pick up in addition to the unloaded material 19) into a forming bale 21. In some embodiments, as shown in FIG. 6, the second pickup 32 can be raised away from the ground so that the first pickup 24 not only picks up the unloaded material 19, but also picks up new material 15 from the path of the baling system 10. Additionally, as illustrated in FIG. 6, the compression means 48 can be used to push down on the material 15 to help move the material 15 to the opening 54. Additionally, the compression means 48 can be further employed to move the compressed material 15 toward the opening 54.

Figure 7:
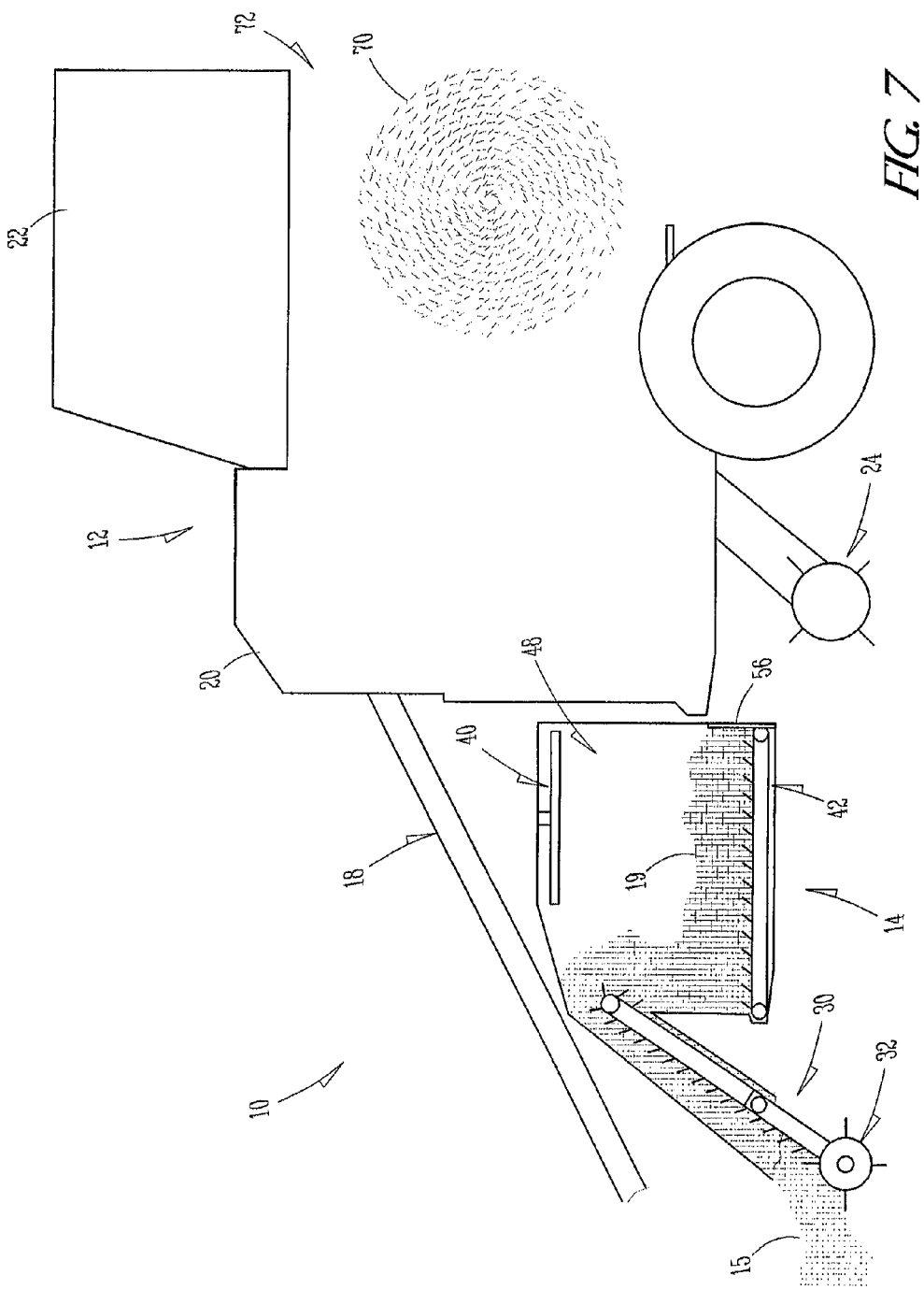
FIG. 7 is a cross-sectional side view of an illustrative baling system showing a bale being ejected from a bailing assembly, in accordance with embodiments of the invention.

Turning now to FIG. 7, another cross-sectional side-view of the illustrative baling system 10 depicted in FIGS. 1-6 is shown during a bale-ejecting stage. Once a bale 70 is formed to a certain size, a bale-size sensor (not illustrated) within the baler 12 detects that the bale 70 is finished (e.g., is of a certain size). In embodiments, the bale-size sensor can communicate an electrical signal to the surge bin 14 to cause the surge bin 14 to begin to collect agricultural material 15 via the second pickup 32 and windrow elevator 30. In other embodiments, the bale-size sensor can be a mechanical device that causes a series of mechanical operations, resulting in activation of the second pickup 32 and windrow elevator 30, whereby the surge bin 14 can begin to be loaded with agricultural material 15. In some embodiments, the bale-size sensor can be communicatively coupled to a network (e.g., a CAN, a wireless network, etc.) through which it communicates with a command module disposed either in the baling system 10 or in the tow vehicle. The command module can cause activation of the loading process of the surge bin 14 in response to receiving the communication. In still further embodiments, the surge bin 14 loading process can be started by the operator during the bale-wrapping or bale-tying and bale-ejection processes, or in response to an indication of any other stage of the bale formation.

After the formed bale 70 has been wrapped or tied, the bale 70 is ejected from the baler 12. In the illustrated embodiment, for example, the rear portion 22 of the baler 12 pivots upwardly to allow the bale 70 to be ejected from the baler 12. In other embodiments, a door on the back of the baler 12 can open, allowing ejection of the bale 70. Any other suitable configuration for removing a formed bale 70 from the baler 12 can be implemented in accordance with embodiments of the invention. Because new agricultural material 15 can be loaded into the surge bin 14 while the formed bale 70 is being wrapped or tied and ejected, the baling system 10 does not have to be stopped during this process and therefore, the tow vehicle can continuously pull the baling system 10 over the ground while minimizing the amount of agricultural material 15 that the baling system 10 fails to pick up as it travels.

Turning now to FIG. 8, an illustrative baling system 80 is depicted in a side-view, showing a PTO extension apparatus 94, in accordance with embodiments of the invention. As illustrated in FIG. 8, the illustrative baling system 80 includes a baler 82 that is coupled to a surge bin 84 via an extended hitch apparatus 86. In the illustrated embodiment, the baler 82 and surge bin 84 are both driven by power transferred to them through a PTO assembly 88. As illustrated, the PTO assembly 88 includes a first PTO shaft 90 that extends from the tow vehicle (not illustrated) to the PTO extension apparatus 94 and a second PTO shaft 92 that extends from the PTO extension apparatus 94 to the baler 82. According to various embodiments of the invention, the first PTO shaft 88 operates to transfer power (e.g., mechanical power, electrical power, hydraulic power, etc.) from the tow vehicle to the PTO extension apparatus 94. According to embodiments, the PTO extension apparatus 94 transfers the power to both the surge bin 94 and the baler 82. In the illustrated embodiment, the PTO transfer apparatus 94 is disposed on the body 26 of the surge bin 84. In other embodiments, the PTO transfer apparatus 94 could be attached to any other portion of the baling system 10 so as to be able to power the baler 82 and the surge bin 84 from power received from the tow vehicle.

FIG. 9 depicts a cross-sectional side-view of the illustrative baling system 80 shown in FIG. 8. As illustrated in FIG. 9, the PTO transfer apparatus 94 includes a cover 95 that houses a gear mechanism 98. The trailing end 96 of the first PTO shaft 90 is mechanically coupled to the gear mechanism 98. In embodiments, the gear mechanism 98 can include any number of gears, chains, pulleys, bearings, and other components as necessary to be operable to transfer power from the first PTO shaft 90 into power that the surge bin 84 can use for operation and into power that is transferred via a connection with a leading end 102 of the second PTO shaft 92. The second PTO shaft 92 transfers that power to the baler 82. As is further illustrated in FIG. 9, the PTO extension apparatus 94 can transfer some of the power from the first PTO shaft 90 into power useable by a drive mechanism 100 in the surge bin 84. According to embodiments, the drive mechanism 100 can include any number of gears, clutches, bearings, and the like. The drive mechanism 100 receives power from the PTO extension apparatus 94 and transfers that power into power that can be used to drive the various operational features of the surge bin 84.

Turning now to FIG. 10, another cross-sectional side-view of another embodiment of an illustrative baling system 110 is depicted. As shown in FIG. 10, the illustrative baling system 110 includes a baler 112 that is coupled with a surge bin 114 using an extension 118 of a hitch assembly 115. As shown, the hitch assembly 115 includes a front portion 116 and a rear portion 118. In the illustrated example, the front portion 116 of the hitch assembly 115 couples a tow vehicle to the baling system and the rear portion 118 of the hitch assembly 115 couples the baler 112 to the surge bin 114. In other embodiments, the hitch assembly 116 could be a single unit, while in further embodiments, the baler and the surge bin could be integrated into a single apparatus.

In the embodiment depicted in FIG. 10, the baling system 110 is driven by a PTO assembly 120. As illustrated, the PTO assembly 120 includes a first PTO shaft 122, a second PTO shaft 124, and a PTO extension apparatus 125. The first PTO shaft 122 transfers power from the tow vehicle to the PTO extension apparatus 125, which transfers the power received via the first PTO shaft 122 to the baler 112 through the second PTO shaft 124. Additionally, the PTO extension apparatus 125 transfers power received via the first PTO shaft to the surge bin 114. In the illustrated embodiment, the PTO extension apparatus 125 is disposed on the front portion 116 of the hitch apparatus 115. In this manner, for example, embodiments of the invention can include a hitch apparatus 115 having a PTO extension apparatus 125 mounted thereon so that the hitch apparatus 115 can be used to retrofit the surge bin 114 to the baler 112. In some embodiments, the PTO extension apparatus 125 can be removeably attached to the hitch apparatus 115 and in other embodiments, the PTO extension apparatus 125 can be fixed to the hitch apparatus 115.

According to some embodiments of the invention, the PTO extension apparatus 125 includes a cover 127 that protects the internal components of the PTO extension apparatus 125 from damage. The first PTO shaft 122 passes through a front side of the cover 127 and is mechanically coupled, at a trailing end 126, to a power transfer mechanism 128. In embodiments, the power transfer mechanism 128 can include gearing, clutches, chains, bearings, levers, or the like. In embodiments, the power transfer mechanism 128 converts transferred power from the first PTO shaft 122 into power that can be used by the surge bin 114. The second PTO shaft 124 is also mechanically, coupled, at a leading end 132, to the power transfer mechanism 128. At its trailing end, the PTO shaft 124 engages the baler 112.

With continued reference to FIG. 10, the illustrative baling system 110 further includes a driving means 134 that facilitates providing power to the mechanisms of the baler 112. In embodiments, the driving system can include a PTO assembly, a set of gears, linkages, bearings, levers, and the like. For example, in the illustrated embodiment, the PTO extension apparatus 125 includes additional gearing 130 that can be used to provide power to the power transfer mechanism 134. In one embodiment, for example, a third PTO shaft 136 is mechanically coupled, at a leading end 138, to the gearing 130 and is mechanically coupled, at a trailing end 140, to another power transfer mechanism 142. According to various embodiments of the invention, the power transfer mechanism 42 converts power received from the third PTO shaft 136 into power that is usable by the various mechanisms in the surge bin 114.

Figure 11:
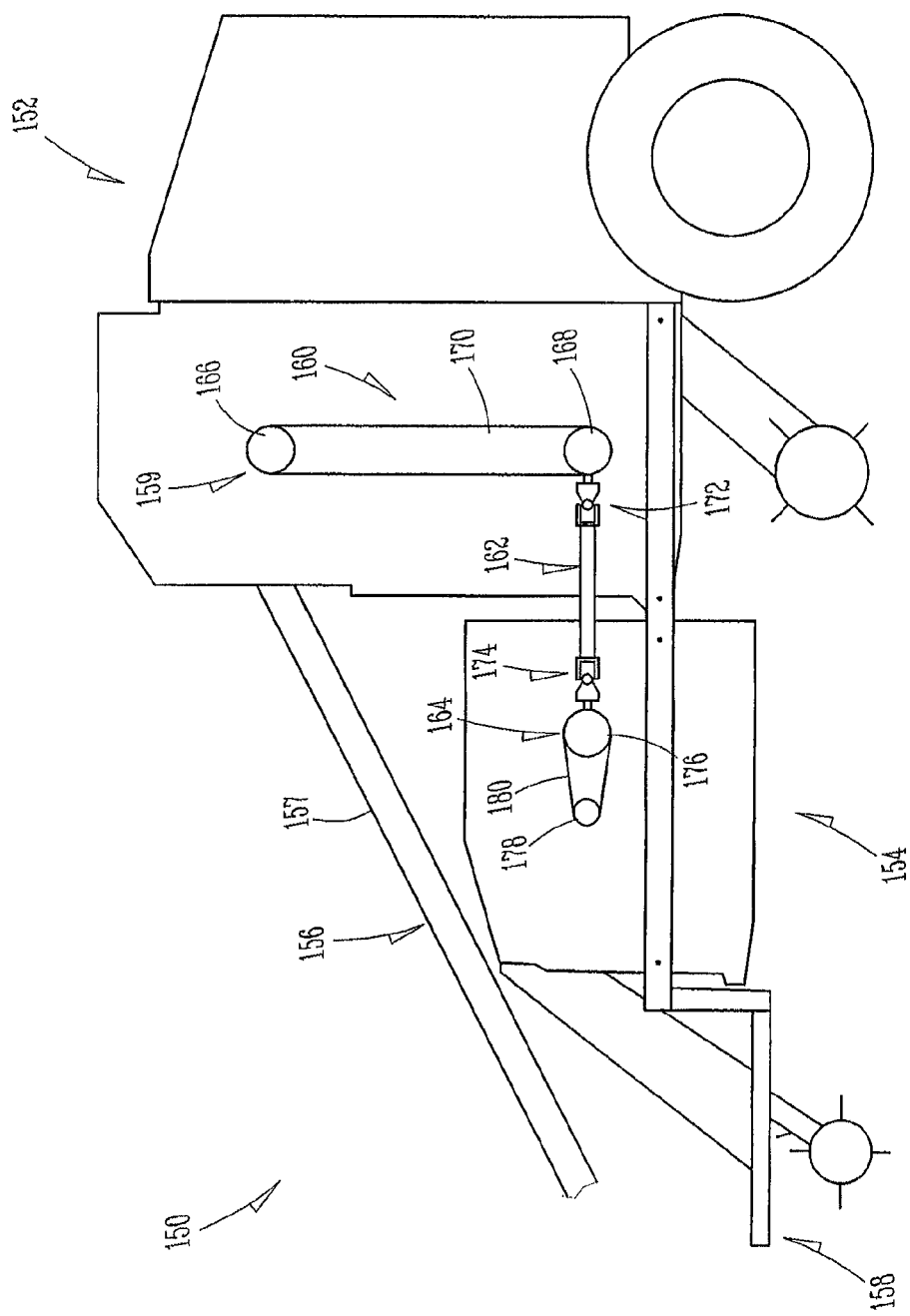
FIG. 11 is a cross-sectional side view of an illustrative baling system showing a secondary PTO assembly, in accordance with embodiments of the invention.

Turning now to FIG. 11, another embodiment of an illustrative baling system 150 is depicted by a cross-sectional side-view drawing. In the illustrated embodiment, the baling system 150 includes a baler 152 that is coupled to a surge bin 154. In some embodiments, the surge bin 154 can be an independent apparatus from the baler 152 and can be coupled to the baler 152, for example, using an extended hitch apparatus 158. In other embodiments, the baler 152 and surge bin 154 are integrated into a single apparatus. As is further shown in FIG. 11, the baling system 150 receives power through a PTO assembly 156.

With continued reference to FIG. 11, the PTO assembly 156 can include a PTO shaft 157 that is mechanically coupled at a leading end, to the tow vehicle (not illustrated for the purposes of clarity and brevity). The PTO shaft 157 is mechanically coupled, at a trailing end 159 to a power transfer mechanism 160 disposed in the baler 152. In embodiments, the power transfer mechanism 160 converts power received from the PTO shaft 157 into power that can be used to drive the baler 152. Further, in embodiments, the power transfer mechanism 160 operates to provide drive power to the surge bin 154.

For instance, as illustrated in FIG. 11, the power transfer mechanism 160 can include a first power converter 166 that converts received power from the PTO shaft 157 into power that can be used to drive the various mechanisms of the baler 152. In embodiments, the power can be, for example, mechanical power, electrical power, hydraulic power, or the like. As is further illustrated in FIG. 11, the power transfer mechanism 160 includes a translation component 170 that translates power to a second power converter 168. In one embodiment, for example, the first and second power converters 166 and 168 can include gearing, levers, linkages, and the like. In an embodiment, for example, the first power converter 166 and the second power converter 168 each include a gear that is coupled to the other using a chain 170. In other embodiments, the translation component 170 can be a rotating shaft (e.g., a PTO shaft), a hydraulic system, an electrical connection, or the like.

As is further illustrated in FIG. 11, the depicted embodiment includes a second PTO shaft 162 that is mechanically coupled, at a trailing end 172, to the second power converter 168 and that is mechanically coupled, at a leading end 174, to a third power converter 164. The PTO shaft 162 provides power from the baler 152 to the surge bin 154. That is, for example, the second power converter 168 converts power received via the transfer mechanism 170 into power that is transferable via the second PTO shaft 162. The third power converter 164 converts power received via the second PTO shaft 162 into power that can be used to drive various mechanisms of the surge bin 154. As shown, the converted power can be transferred throughout the surge bin 154 using, for example, a first set of gears 176 and 178 that are interconnected by a gear chain 180. In other embodiments, rotating shafts, hydraulic pistons, or any other mechanism for transferring power from one component of the surge bin 154 to another.

Turning now to FIG. 12, another embodiment of an illustrative baling system 200 is depicted in a cross-sectional side-view. The illustrative baling system 200 includes a baler 210 that is coupled to a surge bin 212. A PTO assembly 214 provides power generated at a tow vehicle (not illustrated) to the baling system 200. As illustrated in FIG. 12, the surge bin 214 includes a body 216 that encloses a chamber 218 into which agricultural material 225 is deposited. In embodiments, the agricultural material is loaded into the surge bin 212 using a windrow elevator 220 that is coupled, at a lower end, to a pickup 222. As shown, embodiments of the baling system 200 include an elevator guard 224 that at least partially covers the windrow elevator 220.

With continued reference to FIG. 12, the baler 210 also includes a pickup 226. As illustrated in FIG. 12, when the surge bin 212 has been loaded with agricultural material 225, the contents 225 of the bin 212 can be deposited into the path of the baler's pickup 226, which picks up the ejected contents 225 of the surge bin 212 as well as any additional agricultural material 227 that is on the ground in the path of the baler's pickup 226. The combination of materials 225 and 227 is loaded into the baler 210, which forms the material 225 and 227 into a bale 230 within a baling chamber 232 disposed in the baler 210.

As is further illustrated in FIG. 12, the surge bin 212 includes a compression means 234 that can be used to apply pressure to the top of the contents 225 of the bin 212 to compress the material 225. In embodiments, as shown in FIG. 12, for example, the compression means 234 includes a contact member 236 that is driven by a compression-means drive assembly 238. The compression-means drive assembly 238 can include any number of different configurations suitable for causing the contact member 236 to apply downward pressure to the contents 225 of the surge bin 212. For instance, the compression-means drive assembly 238 can utilize a mechanical drive system, an electrical drive system, an inertial drive system, a hydraulic drive system, or the like.

Additionally, as shown in FIG. 12, the surge bin 212 includes a slideable door 242 that selectively covers an opening 244 in the surge bin 212. While the surge bin 212 is being loaded with agricultural material 225, the door 242 remains closed so that the material 225 remains in the surge bin 212. The surge bin 212 includes a translation means 246. According to various embodiments of the invention, the translation means 246 can include any number of different types of mechanisms adapted for agitating and/or moving the material 225 in the chamber 218 of the surge bin 212. In some embodiments, for example, the translation means 246 can include a conveyor, an auger, or the like.

Once the surge bin 212 has reached a certain capacity, or, alternatively, upon receiving a signal (e.g., a mechanical action, an electrical signal, a magnetic pulse, etc.), the pickup 222 is deactivated and additional material 225 is no longer loaded into the surge bin 212, as is depicted in FIG. 12. At this point, for example, the pickup 226 on the baler 210 may begin picking agricultural material 227 off of the ground and moving the material 227 into the baling chamber 232 of the baler 210. When the time is appropriate for initiating a bin-unloading process, the door 242 slides open to expose an opening 244 in the surge bin 212, through which the contents 225 of the surge bin 212 are unloaded onto the ground in the path of the baler's pickup 226. In some embodiments, the compression means 234 can be used to help move the contents 225 of the surge bin 212 toward the opening 244. Additionally, in some embodiments, the translation means 246 also can be used to help move the contents 225 of the surge bin 212 toward the opening 244.

As the contents 225 of the surge bin 212 are unloaded, the pickup 226 can pick up the unloaded contents 225 of the surge bin 212 in addition to additional material 227 from the ground. The combination of materials 225 and 227 are fed into the baling chamber 232, where they are formed into a bale 230. According to embodiments of the invention, the door 242 can slide horizontally or vertically and can be operated by any number of mechanisms such as, for example, a mechanical drive mechanism, an electrical drive mechanism, an inertial drive mechanism, a hydraulic drive mechanism, or the like.

To further explain embodiments of illustrative methods of baling agricultural material using a baling system in accordance with embodiments of the invention, FIGS. 13A-13F depict an illustrative baling system 300 at a number of different stages 301, 302, 303, 304, 305, and 306 of a baling process. At a beginning stage 301, as the baling system 300 is moved toward the left (with respect to the reference view illustrated) (i.e., "forward"), agricultural material 310 is picked up from the ground 309 by a first pickup 312, which is coupled to a baler 316. The first pickup 312 picks up the material 310 and provides the material 310 to the baling chamber 314 of the baler 316. Within the baling chamber 314, the baler 316 begins to form the material 310 into a bale 315.

Figure 13A:
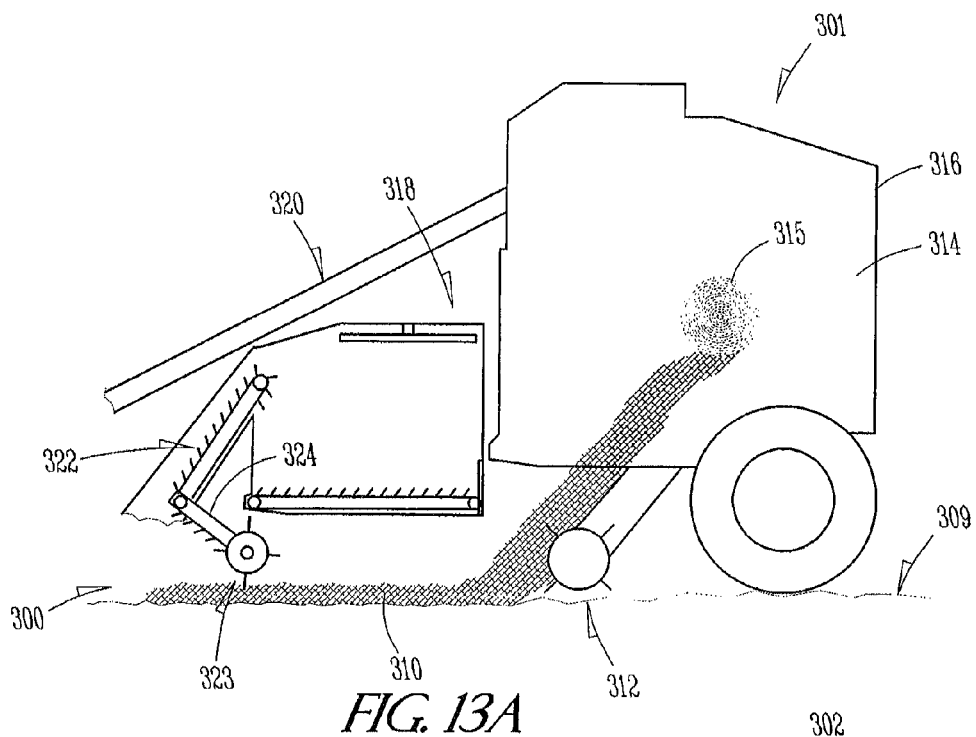
FIGS. 13A-13F depict side views of an illustrative baling system at different stages of a baling operation, in accordance with embodiments of the invention.
Figure 13B:
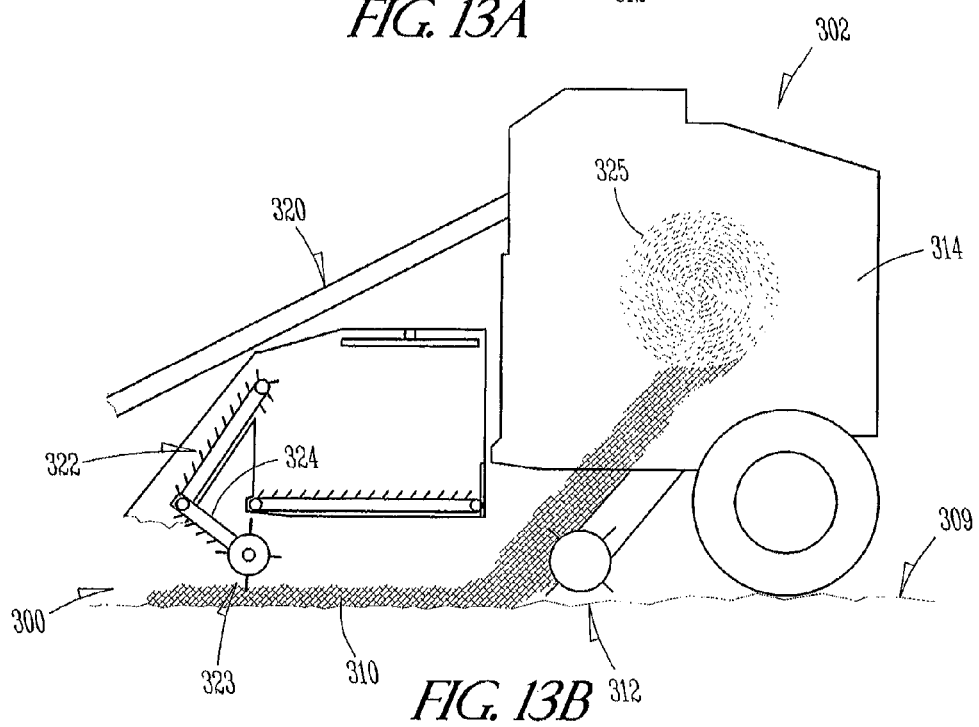

As is illustrated in FIG. 13A, during this illustrative beginning stage 301, a second pickup 323, which is disposed at the lower end of an elevator 322 can be raised off of the ground 309 so that it will not interfere with material 310 that is to be picked up by the first pickup 312. In an embodiment, for example, the elevator 322 can include a pivotable portion 324 that can pivot up and away from the ground 309. Moreover, a PTO assembly 320 can be utilized to provide power to the baling system 300 so that the baling system 300 can perform the functionalities described herein. It should be understood that the PTO assembly 320 can include any number of different types of PTO assemblies, including assemblies having multiple PTO shafts, PTO extension apparati, and the like. As shown at a second illustrative stage, depicted in FIG. 13B, the baler 316 continues to form the material 310 until a complete bale 325 is formed. In various embodiments, sensors, levers, or the like can be used to determine that the bale 325 is completed.

Figure 13C:
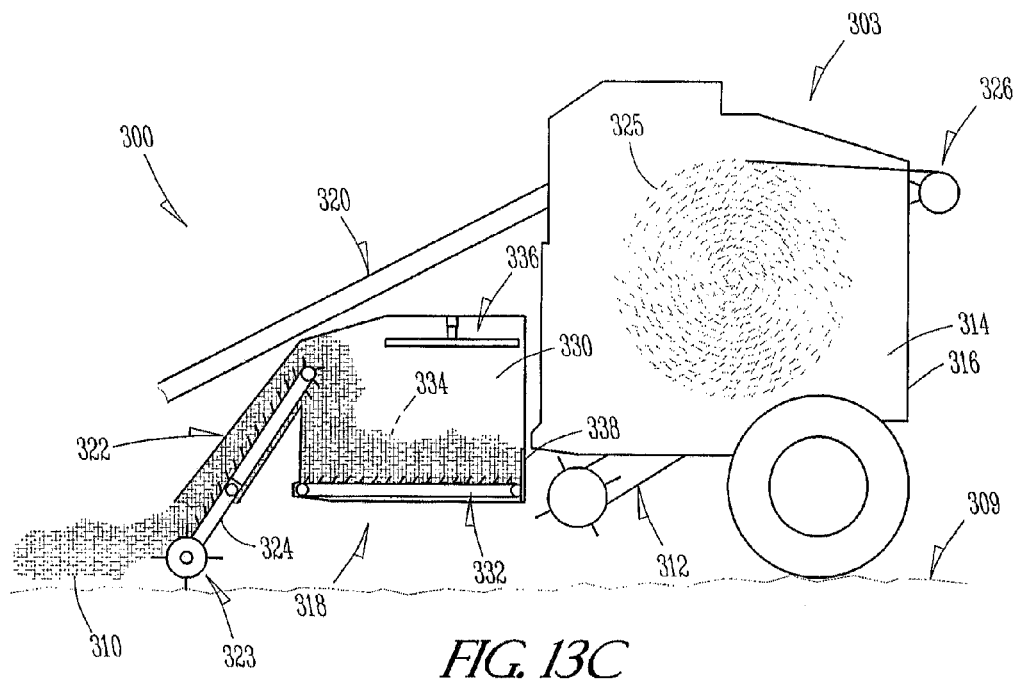
Figure 13D:
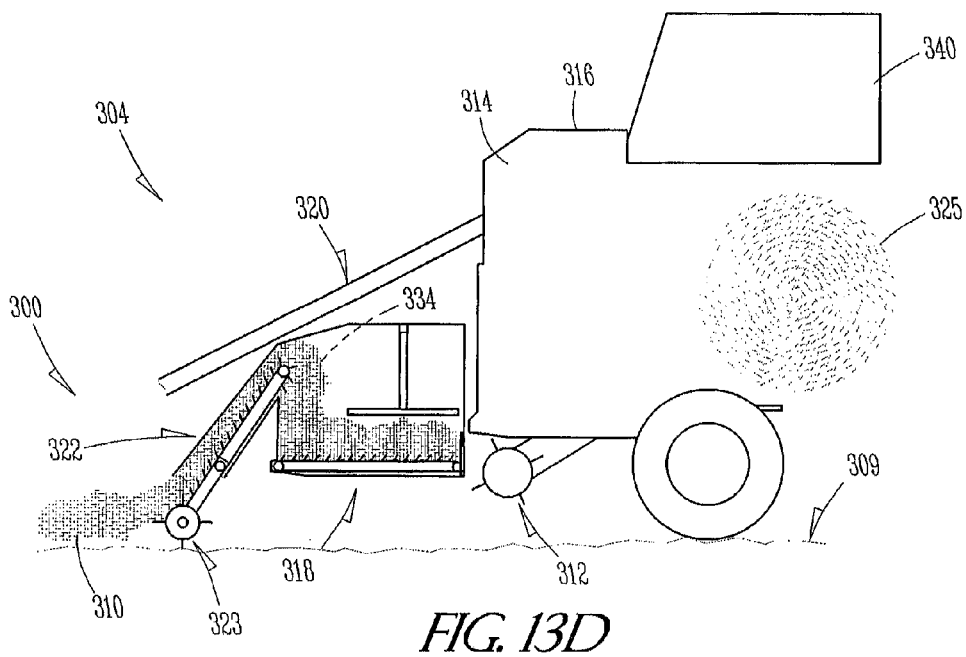

Turning to FIG. 13C, an illustrative bale-finishing stage 303 is depicted. As illustrated, a wrapping or tying mechanism 326 wraps or ties the completed bale 325. At a substantially similar time, the pivotable portion 324 of the elevator 322 is lowered, allowing the second pickup 323 to pickup agricultural material 310 lying on the ground 309 in its path. According to various embodiments, the activation of the bin-loading process can be automatic in response to the beginning of the bale-finishing process, in response to a signal, in response to a mechanical operation, or the like. For instance, according to some embodiments, the baler 316 can include a bale-size sensor 329, which can be activated when the bale reaches a certain size. Upon activation, the bale-size sensor 329 causes initiation of the bale finishing process, In some embodiments, the bale-size sensor 329 sends a signal to a control module to indicate that the bale is complete. In other embodiments, the bale-size sensor could include a pivotable lever that, when engaged by the bale 327, causes a series of linkages, gears, or the like, to move, thereby mechanically initiating the bale finishing process. Other configurations are possible as well, including hydraulics, magnetics, and the like.

With continued reference to FIG. 13C, as the baling system 300 continues to move to the left, the material 310 is picked up by the second pickup 323 and transferred, by the elevator 322, to the chamber 330 of the surge bin 318. As is also illustrated, the surge bin 318 can include a translation means 332 that agitates the contents 334 of the surge bin 318. Additionally, the surge bin 318 can include a compression means 336 that can be used to push down on the top of the contents 334 of the surge bin 318. Moreover, the surge bin 319 includes a moveable door 338 that can be selectively opened to allow the contents 334 of the surge bin 318 to be unloaded. While the surge bin 318 is being loaded, the bale 325 may be ejected onto the ground 309 behind the baling system 300. In some embodiments such as, for example, the illustrated embodiment of FIG.13D, the baler 316 includes a rear hinged portion 340 that can be swiveled out of the way to allow for the completed bale 325 to be unloaded from the baler 316.

Figure 13E:
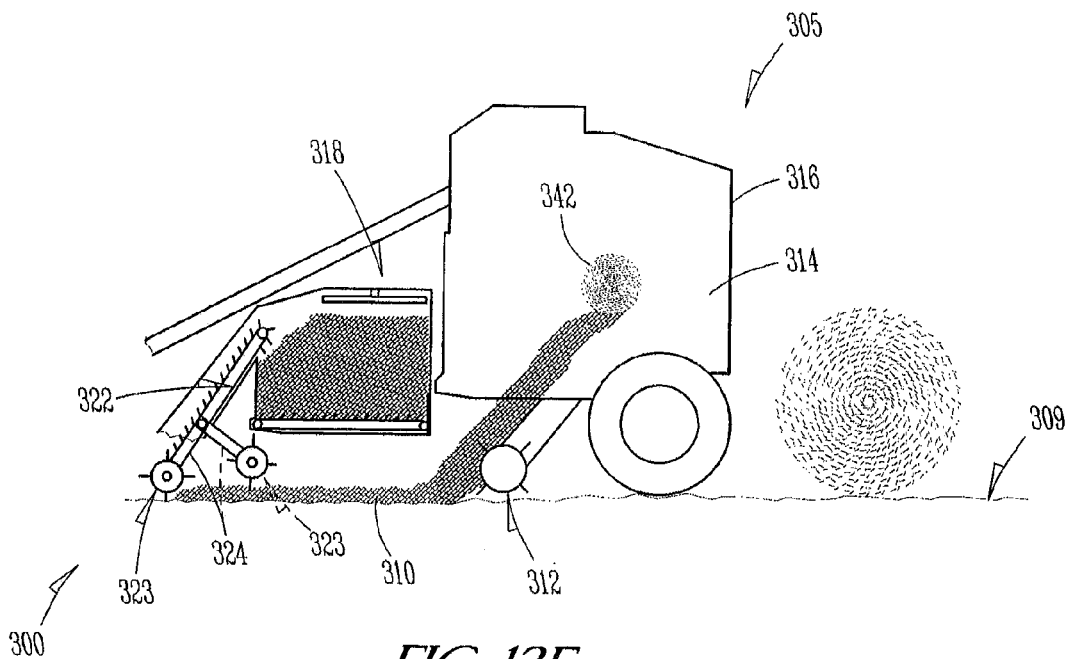

Turning now to FIG. 13E, the illustrative baling system 300 is depicted in a state 305 in which the surge bin 318 has been filled. At this point, the second pickup 323 can be moved out of the way to allow for the material 310 to pass underneath and into the first pickup 312. Once the surge bin 318 is filled, the first pickup 312 is reengaged and begins picking up material 310. The material 310 is received within a baling chamber 314 in the baler 316, which begins to form the material 310 into a bale 342. At a certain point in time, or in response to some event or signal, a moveable door 346 on the surge bin 318 is moved to expose an opening 348 in the surge bin 318. The contents 334 of the surge bin 318 can be unloaded from the surge bin 318 via the opening 348. In embodiments, as illustrated in FIG. 13F, the unloaded contents 334 of the surge bin 318 can also be picked up by the first pickup 312 and used in forming the bale 342, preferably although not necessarily metered out during the next bale formation cycle.

Figure 13F:
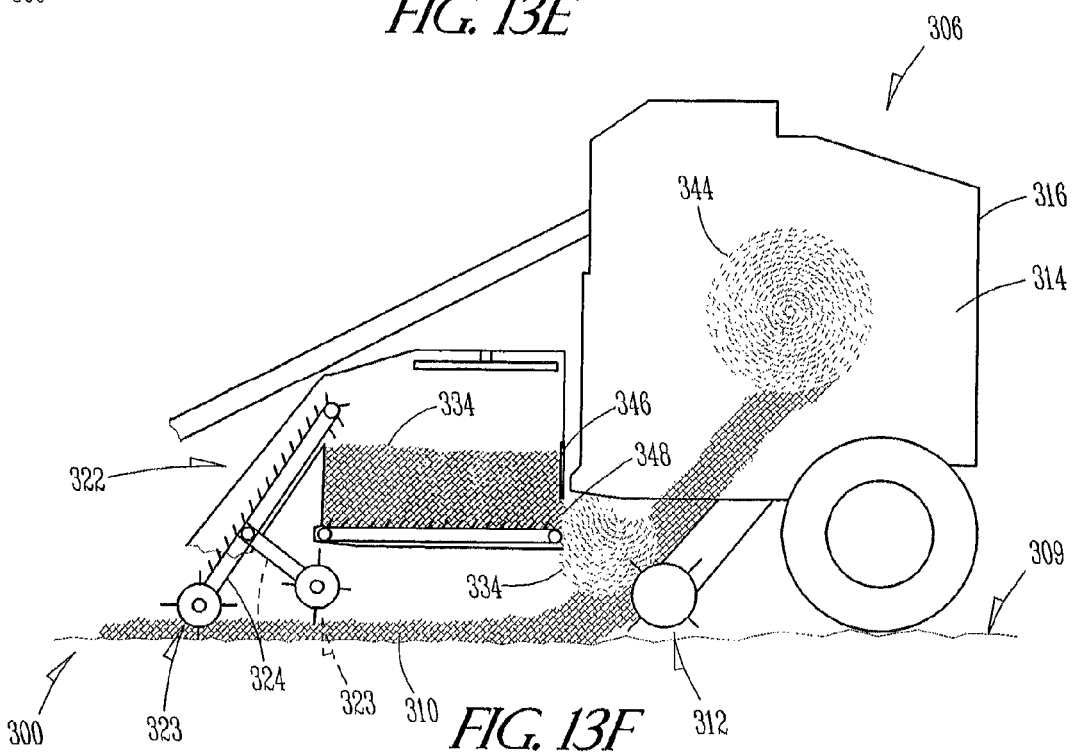

Turning now to FIG. 13F, the baling system 300 is depicted as being in a state 306 in which the surge bin 318 is being unloaded. As indicated, a slideable door 346 can slide out of the way of an opening 348 in the surge bin 318, thereby allowing the contents 334 of the surge bin 348 to be unloaded. The first pickup 312 picks up the unloaded contents 334 and additional material 310 that is on the ground 309 in front of the baling system 311. Upon being received into the baling chamber 314, this new load of material 310 and 334 is formed into a bale 344 and the process repeats, allowing the baling system 300 to be moved continuously over the ground 309.

Turning now to FIG. 14, a flow diagram depicts an illustrative method of using a baling system having a baler with a first pickup coupled to a surge bin 318 having a second pickup. As shown at a first illustrative step, step 402, the baler is activated. In embodiments, the baler can be automatically activated and in other embodiments, the operator can manually control the activation of the baler.

Similarly, as indicated at step 404, the illustrative method includes activating the first pickup and receiving agricultural material (e.g., "windrow") into a baling chamber of the baler.

At step 408, embodiments of the illustrative method 400 include beginning to form bales. At step 410, a bale-size sensor determines that the bale is completed. Upon, or substantially contemporaneous with, completion of the bale, the second pickup is activated, as shown at FIG. 412 and, as is further indicated at step 414, the illustrative method includes receiving material into the surge bin. Meanwhile, as shown at step 416, the bale is wrapped and/or tied and, as depicted at step 418, ejected from the baler.

With continued reference to FIG. 14, and as indicated at step 420, the first pickup is activated and, at step 422, the baling chamber begins to receive agricultural material. At step 424, the second pickup is deactivated and, consequently, the surge bin stops receiving agricultural material, as depicted at step 426. According to embodiments, and, as depicted at step 428, the second pickup can be raised out of the path of the first pickup. At step 430, the contents of the surge bin are emptied. In some embodiments, the surge bin contents can be emptied directly into the baler and, in other embodiments, the surge bin contents are emptied onto the ground in the path of the first pickup. In either case, as indicated at a final illustrative step, step 432, the baling chamber receives the surge bin contents that have been emptied from the surge bin.

The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

The invention claimed is:

1. A baling system for creating bales of agricultural material, the system comprising:
    a baling assembly having a baling chamber, wherein the baling assembly includes a first pickup that picks agricultural material up from the ground and transfers the material to the baling chamber where the material is formed into a bale; and
    a surge bin disposed in front of and separate from the baling assembly, wherein the surge bin includes a second pickup that picks up agricultural material from the ground and transfers the material to a chamber disposed within the surge bin where it remains while the baling assembly forms a bale.

2. The system of claim 1, further comprising means for translating the material within the chamber of the surge bin.

3. The system of claim 2, wherein said means for translation includes a conveyor having a plurality of flights.

4. The system of claim 2, wherein said means for translation includes an auger.

5. The system of claim 1, further comprising means for compressing the material within the chamber of the surge bin.

6. The system of claim 1, wherein the surge bin includes an opening through which agricultural material is ejected.

7. The system of claim 1 wherein the surge bin includes an opening through which the agricultural material within the chamber is ejected and a door disposed on the surge bin for closing said opening.

8. A baling system for creating bales of agricultural material, the system comprising:
    a baling assembly having a baling chamber, wherein the baling assembly includes a first pickup that picks agricultural material up from the ground and transfers the material to the baling chamber where the material is formed into a bale and secured; and
    a surge bin disposed in front of the baling assembly wherein the surge bin includes a second pickup that picks up agricultural material from the ground and transfers the material to a chamber disposed within the surge bin while said baling assembly secures said bale.

9. The baling system of claim 8 wherein securing said bale comprises tying and occurs generally simultaneously with said agricultural material being picked up by said second pickup.

10. The baling system of claim 8 wherein when said bale is to be secured said baling assembly sends a signal and the second pickup is activated to pick up agricultural material.

11. The baling system of claim 8 wherein when said bale is being secured the second pickup is activated to pick up agricultural material.

12. The baling system of claim 8 wherein when said bale is nearly formed, said second pickup is activated to pick up agricultural material.

13. The baling system of claim 10 further comprising ejecting said bale from said baling assembly wherein said second pickup is deactivated generally simultaneously with ejecting said bale.

14. The baling system of claim 1 further comprising means for lowering said second pickup to the ground to pick up agricultural material.

15. A baling system for creating bales of agricultural material, the system comprising:
    a baling assembly having a baling chamber, wherein the baling assembly includes a first pickup that picks agricultural material up from the ground and transfers the material to the baling chamber where the material is formed into a bale, secured and ejected; and
    a surge bin disposed in front of and separate from the baling assembly, wherein the surge bin includes a second pickup that picks up agricultural material from the ground and transfers the material to a chamber disposed within the surge bin from which it is transferred when the baling chamber empties.

16. A method for using a baling system comprising a baling assembly having a baling chamber, wherein the baling assembly includes a first pickup that picks agricultural material up from the ground and transfers the material to the baling chamber where the material is formed into a bale, secured and ejected; and a surge bin disposed in front of and separate from the baling assembly, wherein the surge bin includes a second pickup that picks up agricultural material from the ground and transfers the material to a chamber disposed within the surge bin from which it is transferred when the baling chamber empties, said method comprising:
    activating said baling assembly to begin forming a bale;
    signaling said surge bin to effect activation of said second pickup to transfer agricultural material into said chamber;
    signaling said surge bin to effect deactivation of said second pickup; and ejecting said bale.

17. The method of claim 16 wherein said signaling said surge bin to effect activation of said second pickup occurs during securement of said bale.

18. The method of claim 16 wherein said signaling said surge bin to effect activation of said second pickup occurs during formation of said bale.

19. The baling system of claim 15 wherein said surge bin further comprises means for compressing the agricultural material.

20. The baling system of claim 15 wherein said surge bin further comprises means to translate the agricultural material.

21. The baling system of claim 20 wherein the chamber disposed in the surge bin further comprises an opening through which agricultural material is ejected.

22. The baling system of claim 21 wherein said means to translate the agricultural material translates said material through said opening to be picked up by said first pickup.

* * * * *